(12) United States Patent
Lafrenier

(10) Patent No.: US 9,970,179 B2
(45) Date of Patent: May 15, 2018

(54) TIPPING INDICATOR FOR A WORK VEHICLE

(71) Applicant: CNH Industrial America LLC, New Holland, PA (US)

(72) Inventor: Richard K. Lafrenier, Burlington, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/318,609

(22) PCT Filed: Jun. 12, 2015

(86) PCT No.: PCT/US2015/035601
§ 371 (c)(1),
(2) Date: Dec. 13, 2016

(87) PCT Pub. No.: WO2015/192034
PCT Pub. Date: Dec. 17, 2015

(65) Prior Publication Data
US 2017/0130429 A1    May 11, 2017

Related U.S. Application Data

(60) Provisional application No. 62/011,618, filed on Jun. 13, 2014.

(51) Int. Cl.
*E02F 9/26* (2006.01)
*B60R 21/013* (2006.01)
(Continued)

(52) U.S. Cl.
CPC .............. *E02F 9/26* (2013.01); *A01G 23/081* (2013.01); *B60Q 5/005* (2013.01); *B60Q 9/00* (2013.01);
(Continued)

(58) Field of Classification Search
CPC ......... E02F 9/26; A01G 23/081; B60Q 5/005; B60Q 9/00; B60R 21/013; B66C 15/06; B66C 23/003
(Continued)

(56) References Cited

U.S. PATENT DOCUMENTS 3,079,080 A    2/1963  Mason
3,824,578 A    7/1974  Harders
(Continued)

FOREIGN PATENT DOCUMENTS

CN    103234701 A   *   8/2013   .............. E02F 9/264

OTHER PUBLICATIONS

CN 103234701 A ENglish translation from the EPO.*

*Primary Examiner* — Yazan A Soofi
(74) *Attorney, Agent, or Firm* — Peter K. Zacharias; Patrick M. Sheldrake

(57) ABSTRACT

A work vehicle includes a frame assembly and an attachment assembly. The attachment assembly has an attachment end pivotally connected to the frame assembly and a distal end configured for receiving a variable load. At least one force sensor senses at least one force associated with the attachment end. The at least one force sensor provides an output signal representing the sensed at least one force. An inclination sensor senses an inclination associated with the frame assembly and provides an output signal representing the sensed inclination. An electrical processing circuit is configured for receiving the output signal from the at least one force sensor, determining a value of a couple at the frame assembly which is associated with the sensed at least one force, comparing the couple with a threshold value which is dependent on the sensed inclination, and controlling the controllable output dependent on the comparison.

13 Claims, 10 Drawing Sheets

(51) Int. Cl.
*B60Q 5/00* (2006.01)
*B60C 15/06* (2006.01)
*B66F 17/00* (2006.01)
*A01G 23/081* (2006.01)
*B66C 23/88* (2006.01)
*B60Q 9/00* (2006.01)
*B66C 15/06* (2006.01)
*B60R 21/00* (2006.01)
*E02F 3/32* (2006.01)
*E02F 3/413* (2006.01)

(52) U.S. Cl.
CPC ............ *B60R 21/013* (2013.01); *B66C 15/06* (2013.01); *B66C 23/88* (2013.01); *B66F 17/003* (2013.01); *B66F 17/006* (2013.01); *B60R 2021/0018* (2013.01); *B60R 2021/0076* (2013.01); *B60R 2021/0079* (2013.01); *B60R 2021/0081* (2013.01); *B60R 2021/01306* (2013.01); *E02F 3/32* (2013.01); *E02F 3/4133* (2013.01)

(58) Field of Classification Search
USPC .......................................................... 701/45
See application file for complete search history.

(56) References Cited

U.S. PATENT DOCUMENTS

| | | |
|---|---|---|
| 3,848,750 A | 11/1974 | Hoge |
| 4,752,012 A | 6/1988 | Juergens |
| 5,224,815 A | 7/1993 | Abels et al. |
| 6,991,119 B2 | 1/2006 | Puszkiewicz et al. |
| 2004/0117095 A1* | 6/2004 | Colburn ................. E02F 3/435 701/50 |
| 2014/0121840 A1* | 5/2014 | Mizuochi ................ E02F 9/265 700/275 |

* cited by examiner

TIPPING INDICATOR FOR A WORK VEHICLE

CROSS REFERENCE TO RELATED APPLICATION

This application is the National Stage of International Application No. PCT/US2015/035601 filed Jun. 12, 2015, which claims priority to U.S. Provisional Patent Application No. 62/011,618 filed Jun. 13, 2014, the contents of which are incorporated herein by reference.

BACKGROUND OF THE INVENTION

1. Field of the Invention

The present invention relates to work vehicles, and, more particularly, to a tendency of a work vehicle to tip which has an extended attachment.

2. Description of the Related Art

Work vehicles can generally be thought of as vehicles which are primarily equipped to do functional work. Such work vehicles can typically be found in the agricultural, construction, industrial and forestry technology sectors. For example, an agricultural harvester is used to harvest grain, a backhoe or excavator (also known as a track hoe) are used to dig and move dirt, a front end loader is used to pick up and move various types of material, depending on the type of attachment at the front end, a swather is used to cut and windrow crop, a crane is used to pick up and move heavy loads, and a feller/buncher is used to cut down, cut to length, stack and move trees. There are also many other types of work vehicles in these technology sectors.

For many types of work vehicles, and attachment assembly is pivotally connected to the frame or chassis of the vehicle and used to perform a work task during operation. For example, an excavator includes an upper frame which is pivotally mounted to a lower frame at a generally vertical pivot axis. The lower frame includes a pair of ground engaging tracks which provide motive force to the excavator. The upper frame includes among other things a power plant, transmission and an operator cab. An attachment assembly includes an inboard boom arm which is pivotally connected to the upper frame and an outboard boom arm which is pivotally connected to the distal end of the inboard boom arm. A material bucket positioned at the distal end of the outboard boom arm is operable to dig and move material such as dirt. As another example, a front end loader includes a loader frame which is positioned at the front of the vehicle and pivotally connected to the frame of the vehicle. Such a front-end loader typically includes a pair of boom arms which are pivotally connected to the loader frame, which in turn is rigidly mounted to the chassis of the work vehicle.

Work vehicles including a pivotal attachment assembly, as described above, can be more susceptible to tipping over during operation, depending on the magnitude of the variable load at the end of the attachment assembly, the position of the attachment assembly relative to the frame of the vehicle, and the slope of the ground on which the work vehicle is operating. Work vehicles of conventional design rely on operator knowledge to prevent tipping over.

What is needed in the art is a work vehicle that is less susceptible to tipping over, regardless of the operating conditions associated with a pivotal attachment assembly.

SUMMARY OF THE INVENTION

The present invention provides a work vehicle with a pivotal attachment assembly, wherein an impending tipping condition is determined and a preventative action is taken, such as a visual or audible indicator to an operator or automatic control of the attachment assembly.

The invention in one form is directed to a work vehicle including a frame assembly and an attachment assembly. The attachment assembly has an attachment end which is pivotally connected to the frame assembly and a distal end which is configured for receiving a variable load. One or more force sensors sense a plurality of forces associated with the attachment end, with each force sensor providing an output signal representing at least one sensed force. An inclination sensor senses an inclination associated with the frame assembly relative to a horizontal reference. The inclination sensor provides an output signal representing the sensed inclination. An electrical processing circuit is coupled with each force sensor, the inclination sensor and a controllable output. The electrical processing circuit is configured for receiving the output signal from each force sensor, determining a value of a couple at the frame assembly which is associated with the sensed forces, comparing the couple with a threshold value which is dependent on the sensed inclination, and controlling the controllable output dependent on the comparison.

The invention in another form is directed to a method of operating a work vehicle which includes a frame assembly and an attachment assembly having an attachment end which is pivotally connected to the frame assembly and a distal end which is configured for receiving a variable load. The method includes the steps of:

sensing a plurality of forces associated with the attachment end;

sensing an inclination associated with the frame assembly relative to a horizontal reference;

determining a value of a couple at the frame assembly which is associated with the sensed forces;

comparing the couple with a threshold value which is dependent on the sensed inclination; and controlling a controllable output, dependent on the comparing step.

An advantage of the present invention is that an onset of tipping in a work vehicle can be detected, and some action taken to reduce or eliminate the tipping tendency.

Another advantage is that the tipping tendency can be determined with only minimal additional sensors needed onboard the work vehicle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The present invention generally relates to a tipping indicator for a work vehicle which determines when an impending tipping condition will occur, and either alerts an operator to the impending tipping condition and/or takes or prevents some action to reduce or eliminate the tipping tendency. In general, the work vehicle includes an attachment assembly with a boom of some sort which is pivotally attached to a frame assembly of the vehicle. The frame assembly can be, e.g., a unitary frame (rigid or articulated, such as a tractor) or a pivoting two part frame (such as an excavator). The pivotal connection in turn can be one of two types, depending on the type of frame construction. In the case of a unitary frame assembly such as a tractor with an attached front end loader, the attachment assembly pivotally connects at a suitable connection location with the frame assembly. In the case of a two part frame assembly, the attachment assembly pivotally connects with an upper frame assembly, which in turn pivotally connects with a lower frame assembly. In either case, the attachment assembly increases the tipping tendency of the work vehicle because of the additional moment arm and forces exerted on the frame assembly (base unit) of the work vehicle. In the descriptions below, an example of each type of work vehicle will be described, with examples of other similar type work vehicles with which the tipping indicator of the present invention can be used.

Figure 1:
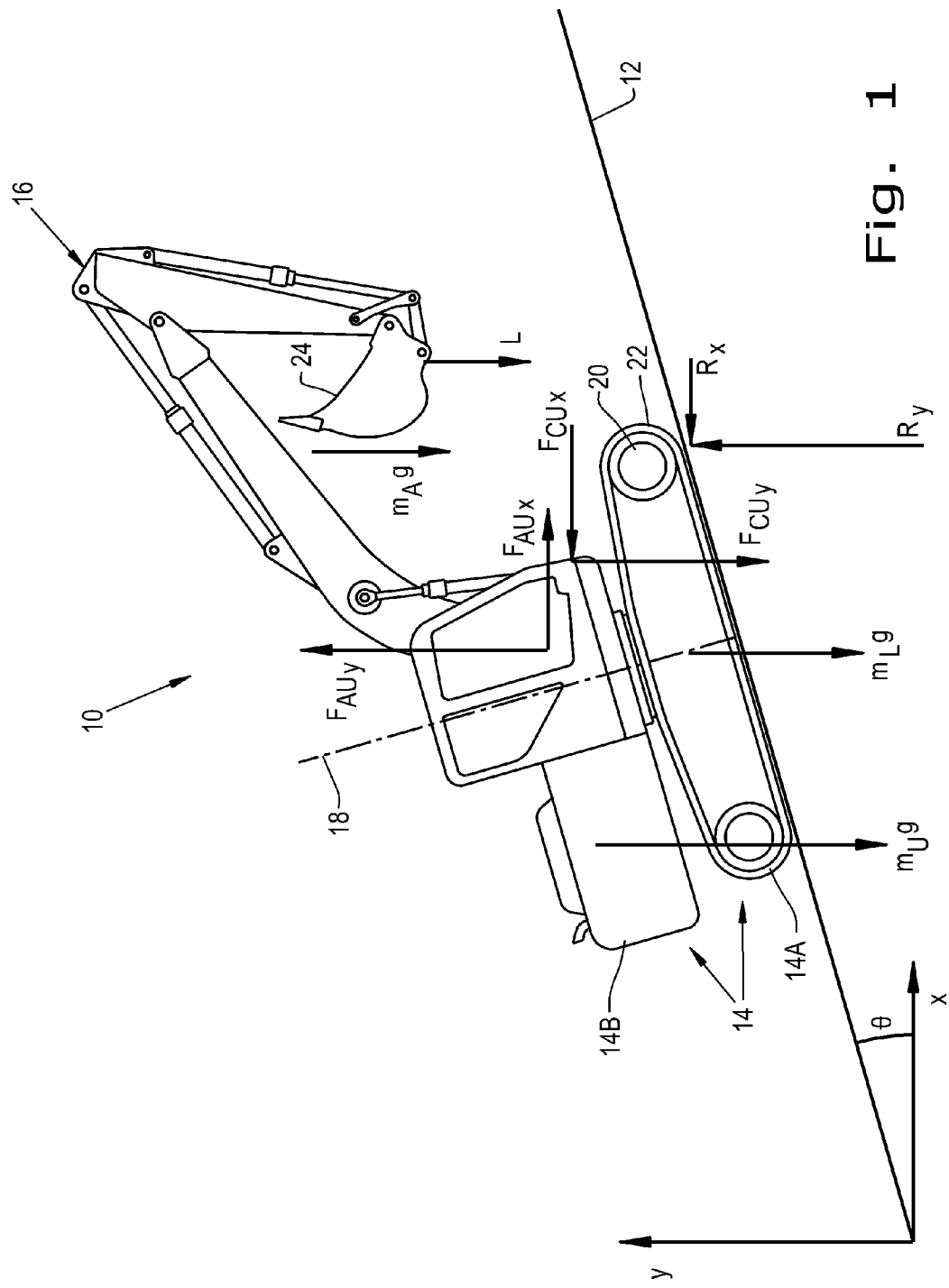
FIG. 1 is a free body diagram of a work vehicle in the form of an excavator on an inclined ground surface.

Referring now to the drawings, and more particularly to FIG. 1, there is shown a free body diagram of a work vehicle in the form of an excavator 10 on an inclined ground surface 12. The inclined ground surface 12 is at an angle θ relative to a horizontal reference. The excavator 10 generally includes a frame assembly 14 and an attachment assembly 16. The frame assembly 14 is of the two part variety and includes a lower frame assembly 14A which is pivotally connected with an upper frame assembly 14B about a vertical pivot axis 18. Although a work vehicle with a two part frame assembly is shown in the form of an excavator 10, it is to be appreciated that such a work vehicle can take other forms which include an upper frame which rotates relative to a lower frame, such as a crane, a sky lift or a feller/buncher.

The excavator 10 is considered to be on the sloped ground surface 12 at an angle θ at a threshold of tipping about the non-driven front idler sprockets 20 which carry the track 22, due in part to a variable load L applied to the material bucket 24 of the attachment assembly 16. Forces acting on the excavator 10 can be described as shown in FIG. 1, where:
$m_U$=mass of upper frame assembly;
$m_L$=mass of lower frame assembly;
$m_A$=mass of attachment assembly;
g=acceleration due to gravity;
$F_{CU}$=force of cylinder on upper frame;
$F_{AU}$=force of attachment on upper frame;
L=external load; and
R=reaction force at the front track idler sprocket (tipping point).

Figure 2:
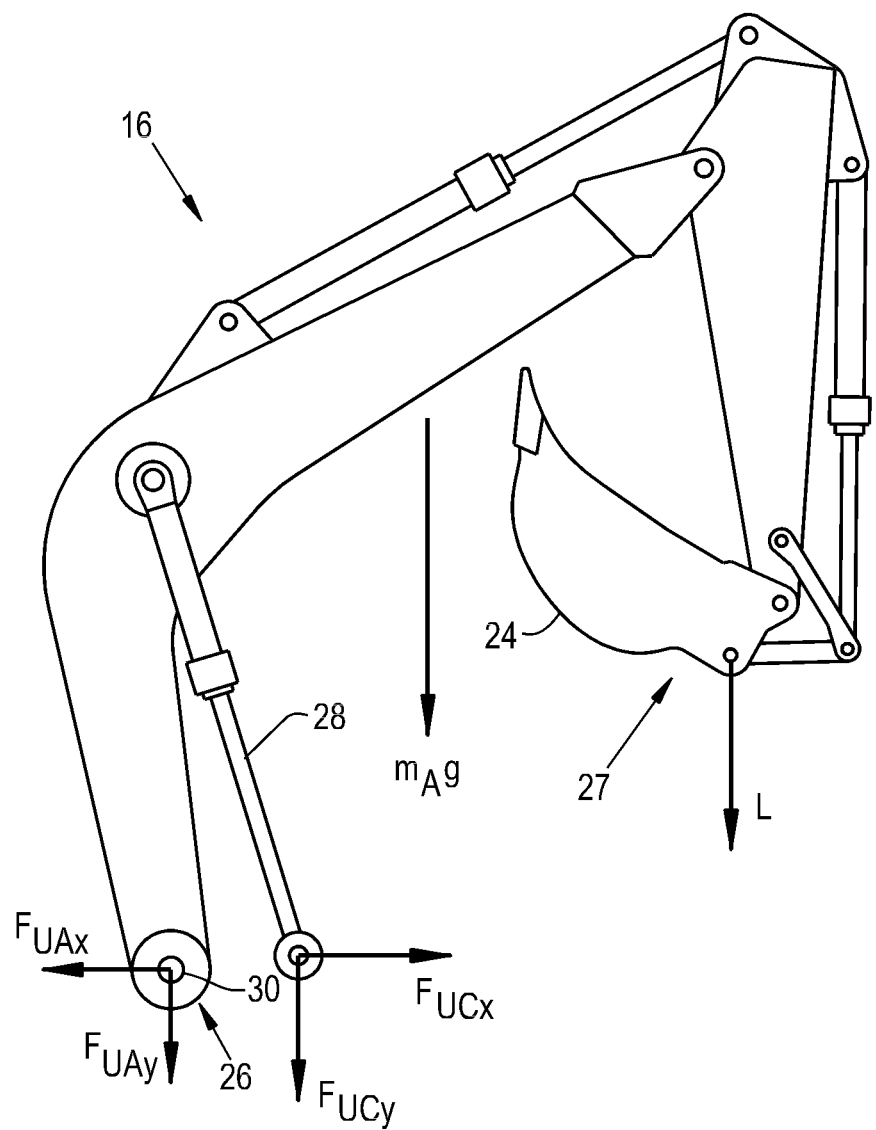
FIG. 2 is a free body diagram of the attachment assembly on the excavator of FIG. 1.

The attachment assembly 16 includes an attachment end 26 which is pivotally connected to the upper frame assembly 14B, and a distal end 27 which is configured for receiving the variable load L. Considering the forces acting on the excavator 10 as shown in FIG. 1, and defining the mass of the attachment assembly 16 as shown in FIG. 2, the forces on the attachment assembly 16 can be portrayed in a simplified 2D representation, where:
$m_A$g=mass of attachment assembly.

Figure 3:
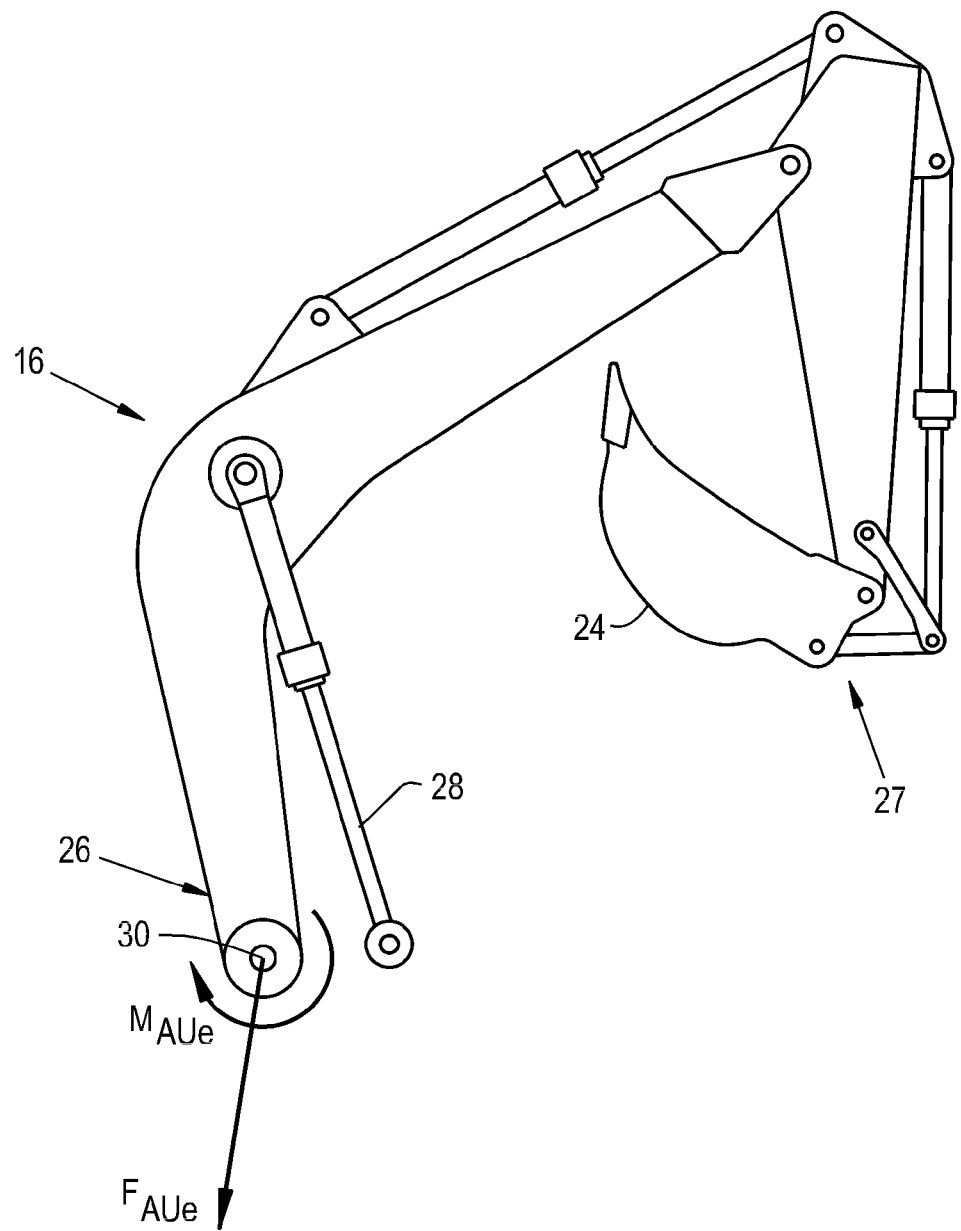
FIG. 3 is another free body diagram of the attachment assembly shown in FIGS. 1 and 2.

By engineering statics analysis, the forces acting on the attachment assembly 16 and the hydraulic cylinder 28 can be resolved to an equivalent force and couple (FIG. 3), where:
$F_{AUe}$=equivalent force of attachment assembly 16 forces on upper frame assembly 14B; and
$M_{AUe}$=equivalent moment of attachment assembly 16 couple on upper frame assembly 14B.

Figure 4:
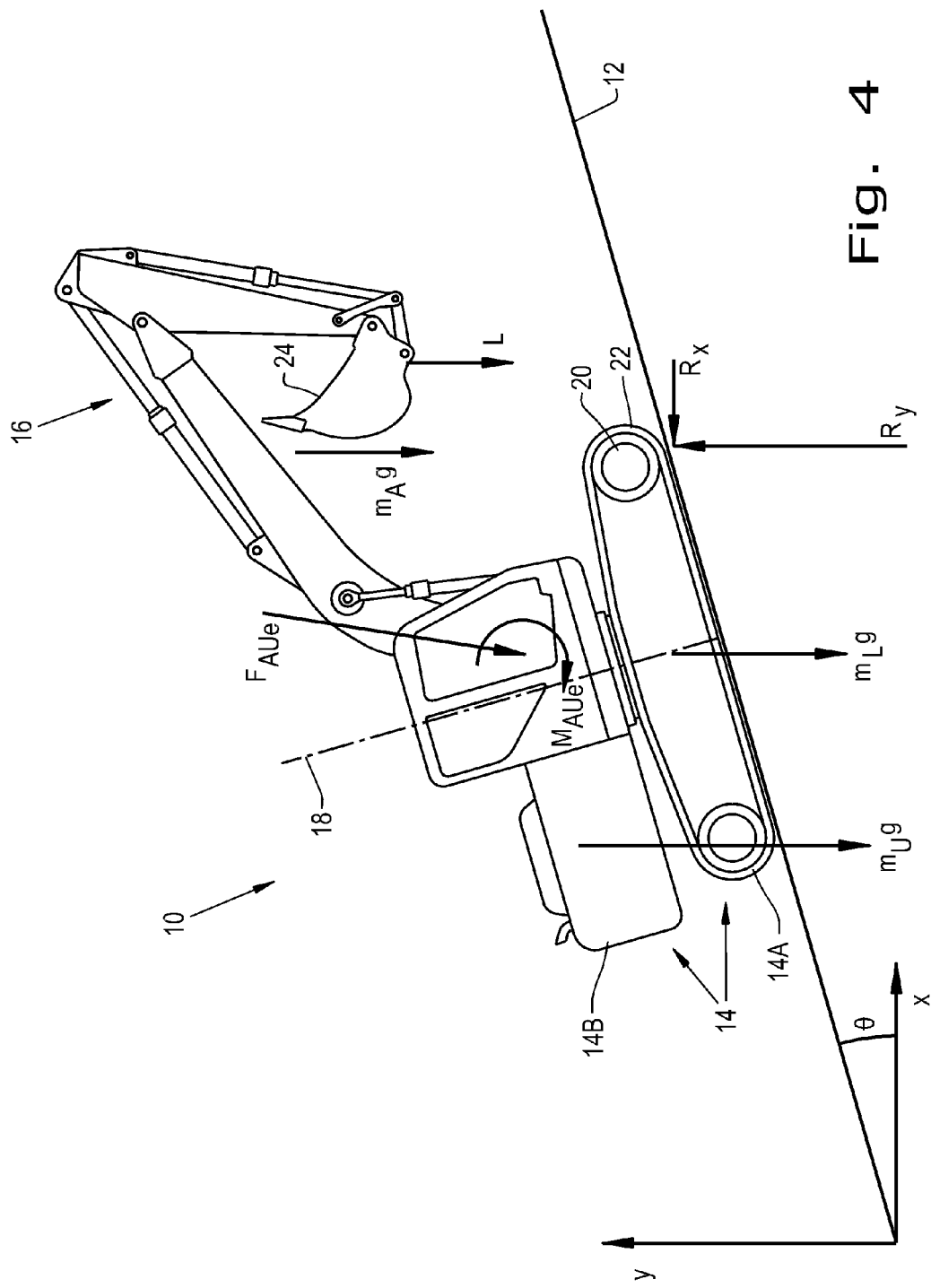
FIG. 4 is another free body diagram of the excavator shown in FIG. 1.

These same forces are then transferred to the attachment location with the upper frame assembly 14B, and the attachment equivalent force and couple acting on the upper frame assembly 14B are likewise represented by (FIG. 4), where:
$F_{AUe}$=equivalent attachment force on upper frame assembly 14B; and
$M_{AUe}$=equivalent attachment moment on upper frame assembly 14B.

Figure 5:
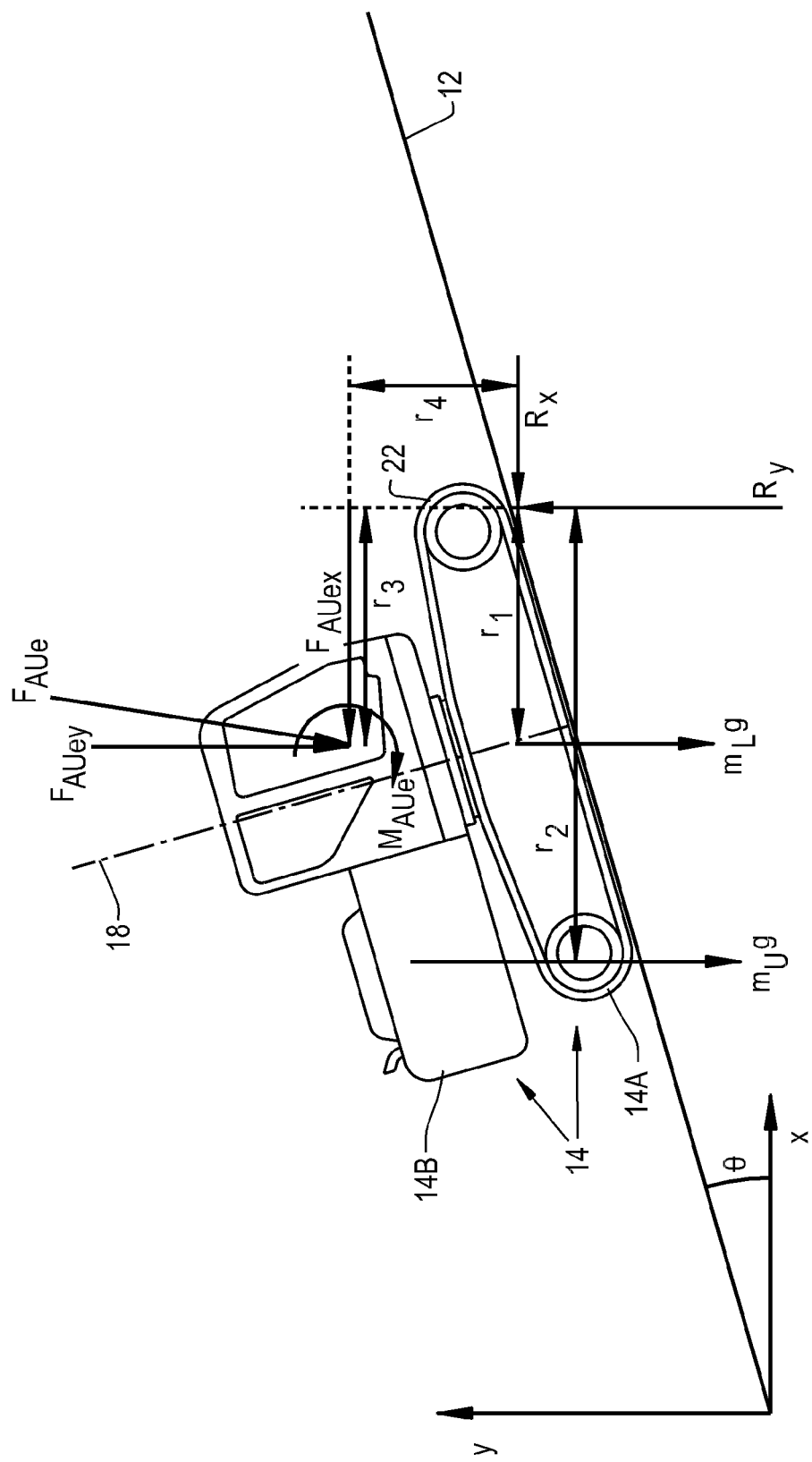
FIG. 5 is another free body diagram of the excavator shown in FIGS. 1 and 4, with the attachment assembly removed.

The forces and moments acting on the frame assembly 14, including lower frame assembly 14A and upper frame assembly 14B, can be summarized as represented below and shown in FIG. 5:

$$\Sigma F_x = 0$$

$$-F_{AUex} - R_x = 0$$

$$\Sigma M_{Tip\ Point} = 0$$

$$-m_L g r_1 - m_U g r_2 - F_{AUey} r_3 - F_{AUex} r_4 + M_{AUe} = 0$$

$$\Sigma F_y = 0$$

$$-F_{AUey} - m_U g - m_L g + R_y = 0$$

Rearranging the equations it can be shown that at the threshold of tipping in a given direction, the moment effect of the attachment assembly's equivalent force plus couple is equal to that due to the centers of gravity of the upper frame assembly 14B and lower frame assembly 14A:

$$\Sigma M_{Tip\ Point} = 0$$

$$-m_L g r_1 - m_U g r_2 - F_{AUey} r_3 - F_{AUex} r_4 + M_{AUe} = 0$$

$$M_{AUe} - F_{AUey} R_3 - F_{AUex} r_4 = m_L g r_1 - m_U g r_2$$

where
$M_{AUe} - F_{AUey} r_3 - F_{AUex} r_4$=the moment effect of the attachment force plus couple, $m_L g r_1 - m_U g r_2$.

As the excavator 10 is brought to the threshold of tipping at increasing reach points of the attachment assembly 16:

The external load required to tip the excavator 10 decreases in proportion to the tipping radius increase;

The moment of the external load about the attachment pivot increases;

The reduced external load results in a lower reaction force at the attachment pivot;

The increase in the external load's moment contribution to tipping the vehicle is offset by a decrease in that of the reaction force of the attachment assembly 16 on the upper frame assembly 14B; and The sum of the external load moment and reaction force moment on the excavator 10 remains constant.

Figure 6:
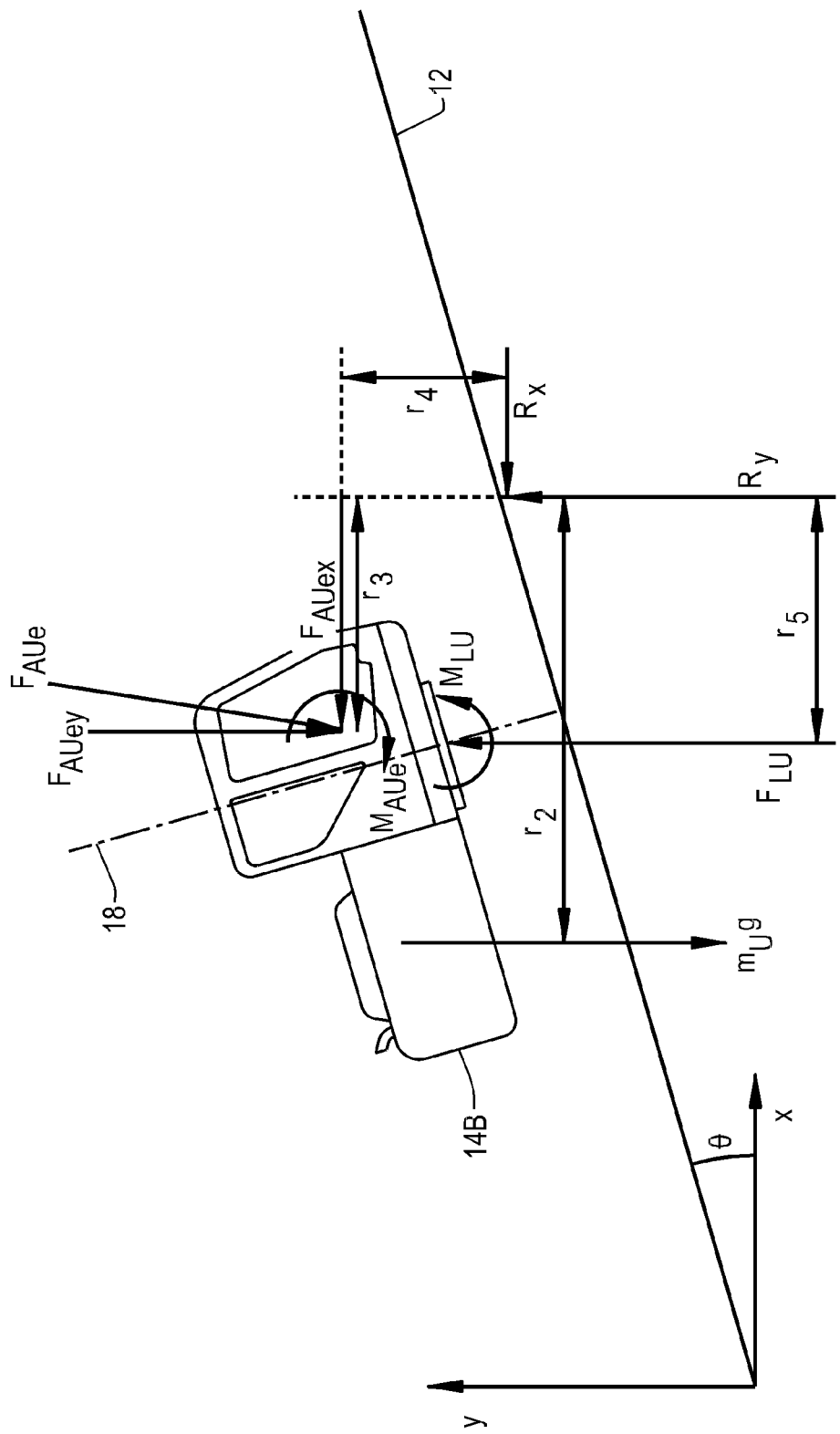
FIG. 6 is a free body diagram of the upper frame assembly on the excavator shown in FIGS. 1, 4 and 5.

Considering a free body diagram of the upper frame assembly 14B (FIG. 6) and recalling that the moment effect of the attachment assembly's equivalent force and couple is equal to that of the upper and lower assembly centers of gravity, it can be shown that the moment of the lower frame assembly 14A on the upper frame assembly 14B, $M_{LU}$, is related to the force transmitted through the center pivot:

$$\Sigma M_{Tip\ Point} = 0$$

$$-m_L g r_1 - m_U g r_2 - F_{AUe_y} r_3 - F_{AUe_x} r_4 + M_{Aue} = 0$$

$$M_{LU} = -m_L g r_1 - m_U g r_2 - F_{AUe_y} r_3 - F_{AUe_x} r_4 + M_{AUe}.$$

It can therefore be concluded that at the threshold of tipping in a given direction, the moment of the lower frame assembly 14A on the upper frame assembly 14B is related to the force transmitted through the center pivot, independent of the position of the attachment assembly 16 or magnitude of external load.

Further, as the relationship represents a balance of the moment applied in a given direction and the vehicle's mass moment available to resist tipping in that direction, the concept can be extended to conclude that the relationship between the moment of the lower frame assembly 14A on the upper frame assembly 14B is also not dependent upon the position of the upper frame assembly 14B with respect to the lower frame assembly 14A. The only factor affecting this value is the slope θ upon which the excavator 10 is operating. Further, the value of the moment exerted by the lower frame assembly 14A on the upper frame assembly 14B, by comparison to its tipping threshold value, can reliably indicate the onset of tipping.

Extending this principle to the general case of tipping in any direction, measurement of the moment and ground slope θ in the lower frame assembly fore/aft and side/side axes, the proximity to the onset of tipping can be predicted for any operating condition. It will be appreciated that for determination of the moment, relevant forces may also be sensed/determined in association with a relevant pivot joint.

Indication to the vehicle operator or inducement and/or prevention of vehicle control can be achieved with traditional instrumentation and signal processing such as strain gauge bending bridges located on the excavator pivotal connection 30, a dual-axis gravity reference accelerometer located on the lower frame and a typical microprocessor-based vehicle controller (described in more detail below).

Figure 7:
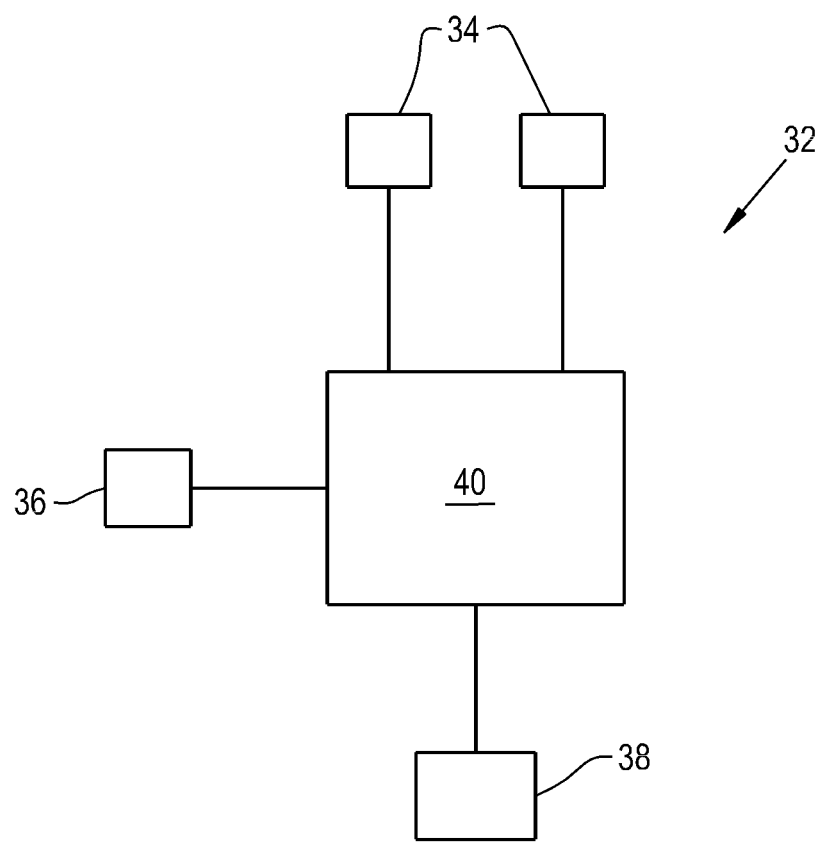
FIG. 7 is a block diagram of an embodiment of a tipping indicator of the present invention.

For example, referring to FIG. 7, there is shown a block diagram of an embodiment of the tipping indicator 32 of the present invention. In general, the tipping indicator 32 includes one or more force sensors 34, an inclination sensor 36, and a controllable output 38, all connected with an electrical processing circuit 40.

The one or more force sensors 34 can be any type of suitable force sensors which are used to measure relevant forces at the different pivot joint(s) on excavator 10. FIG. 7 illustrates two force sensors 34, but the actual number can vary, depending on the application. The term "force sensor" as used herein, is intended broadly to mean sensors which measure any type parameter associated with forces, such as forces, moments, etc. Stain gauges are an example of one type of force sensor. Strain gauges can also be used in a bending bridge which uses multiple force sensors to determine a moment at a given location. Other types of force sensors are also possible.

The inclination sensor 36 senses an inclination associated with the frame assembly 14 relative to the horizontal reference shown in FIG. 1. The inclination sensor 36 provides an output signal representing the sensed inclination to the electrical processing circuit 40. In the illustrated embodiment, the inclination sensor 36 is located on and senses an angle of inclination θ of the lower frame assembly 14A. However, the inclination sensor 36 can be located at other suitable locations, such as the upper frame assembly 14B. Regardless of the exact location of the inclination sensor 36, the sensed inclination is relative to the horizontal reference, which is directly engaged by the lower frame assembly 14A, and therefore the sensed inclination relates to the inclination of the lower frame assembly 14A. Further, it is also known for some excavators to use an upper frame assembly 14B which is self-leveling relative to the lower frame assembly 14A. An excavator configured with such a self-leveling frame assembly still senses an inclination associated with the lower frame assembly relative to a horizontal reference.

Figure 8:
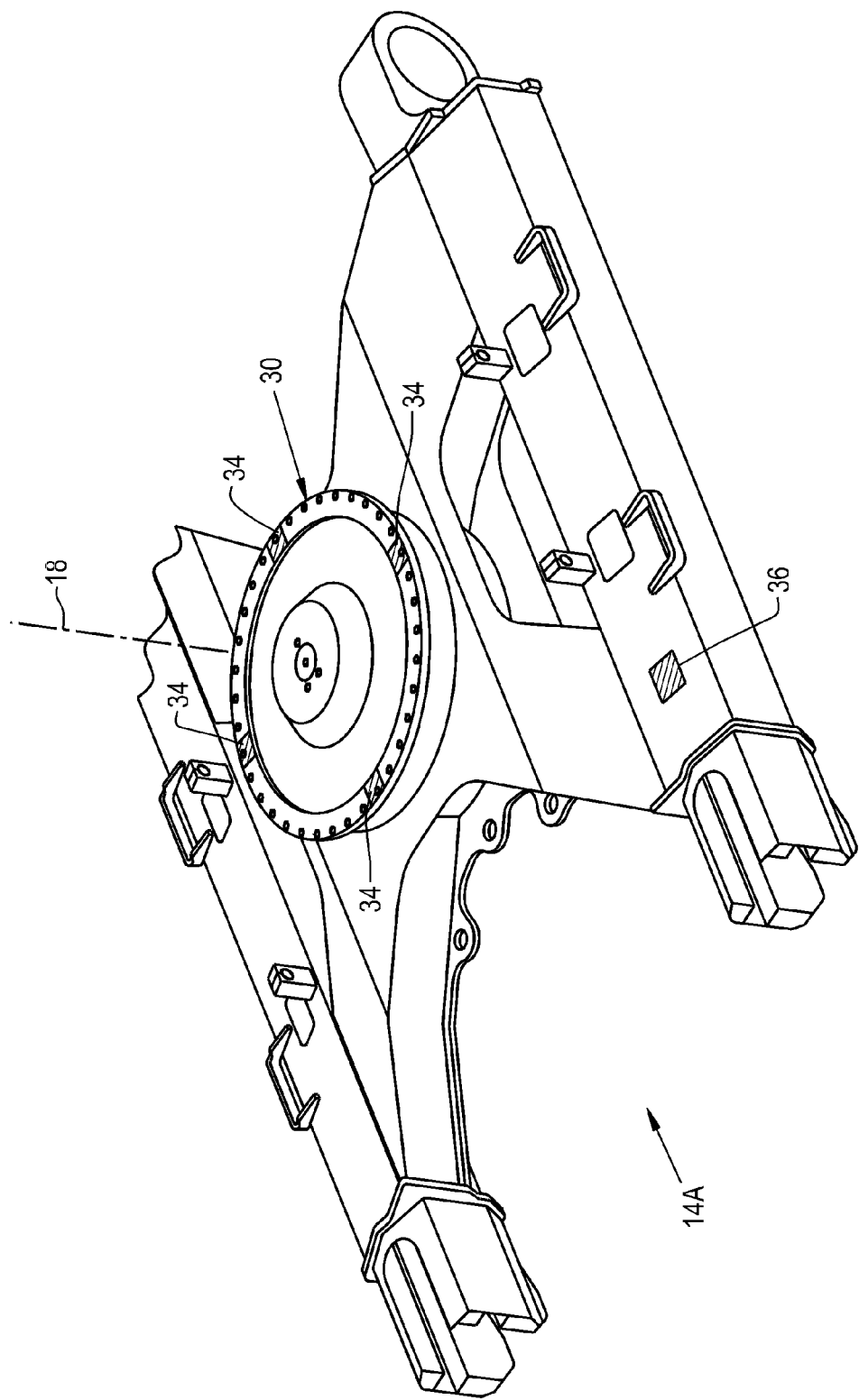
FIG. 8 is a perspective view of a lower frame assembly, less the track and idler sprockets, which can be used on the excavator shown in FIGS. 1 and 4-6.

FIG. 8 is a perspective view of the lower frame assembly 14A, less the drive sprocket, idler sprocket and track, which can be used on the excavator 10 shown in FIGS. 1 and 4-6. FIG. 8 shows an example of suitable placement locations for the force sensors 34 and inclination sensor 36 on the lower frame assembly 14A. In the illustrated embodiment, four force sensors 34 are placed approximately 90° apart from each other at the fore-aft and side-to-side positions of the lower frame assembly 14A. The force sensors 34 can be in the form of instrumented bolts around the periphery of the pivotal connection 30 of the lower frame assembly 14A, with internal strain gauges which measure forces. It is also possible that the four sensors could be placed 90° apart but at 45° positions relative to the fore-aft and side-to-side positions of the lower frame assembly 14A. Further, it is also possible to use only two force sensors placed approximately 90° apart from each other on the lower frame assembly 14A, with the sensors being capable of measuring both compressive and tensile forces to determine the direction and magnitude of the applied forces to the pivot axis of the lower frame assembly 14A. It will be appreciated that other types of force sensors, as well as placement locations, can be used to determine an attachment force and couple at the pivot joint of the lower frame assembly 14A.

The controllable output 38 is under the control of electrical processing circuit 40 and can be one or more devices which take some type of preventative action to inhibit or prevent tipping of the excavator 10. For example, the controllable output 38 can be a visual and/or audible indicator to an operator, such as a visual display and/or alarm in the operator cab of the excavator 10. Alternatively, the controllable output 38 can be some type of actuator for automatic controlling a preventative action, or preventing further movement of the attachment assembly 16, such as the hydraulic cylinder 28. For example, the hydraulic cylinder 28 can be controlled to retract the boom arms of the attachment assembly 16, or lower the material bucket 24 to the ground. Other types of controllable outputs are also possible. FIG. 7 shows a single controllable output 38, but the tipping indicator 32 can also include multiple controllable outputs 38.

The electrical processing circuit 40 is coupled with the force sensor(s) 34, the inclination sensor 36 and the controllable output(s) 38. The electrical processing circuit 40 is configured for receiving the output signal from each force sensor 34, determining a value of a couple at the frame assembly which is associated with the sensed forces, comparing the couple with a threshold value which is dependent on the sensed inclination, and controlling the controllable output dependent on the comparison. It will be appreciated that for determination of the moment, relevant forces may also be sensed/determined in association with a relevant pivot joint. The electrical processing circuit 40 is also configured for determining a value of an equivalent force associated with the sensed forces, comparing the equivalent force with a threshold value, and controlling the controllable output dependent on the comparison of the equivalent force. In the illustrated embodiment, the electrical processing circuit 40 is configured as a digital controller, but could also be configured as an analog or hardwired processor or an Application Specific Integrated Circuit (ASIC).

Some of the data and/or values which are used by the electrical processing circuit 40 can be calculated by the electrical processing circuit 40 and/or retrieved from a memory, such as a look-up table. For example, the threshold values can vary depending on the slope θ of the ground surface. These different threshold values can be stored in a look-up table and the values retrieved and used by the electrical processing circuit 40.

Figure 9:
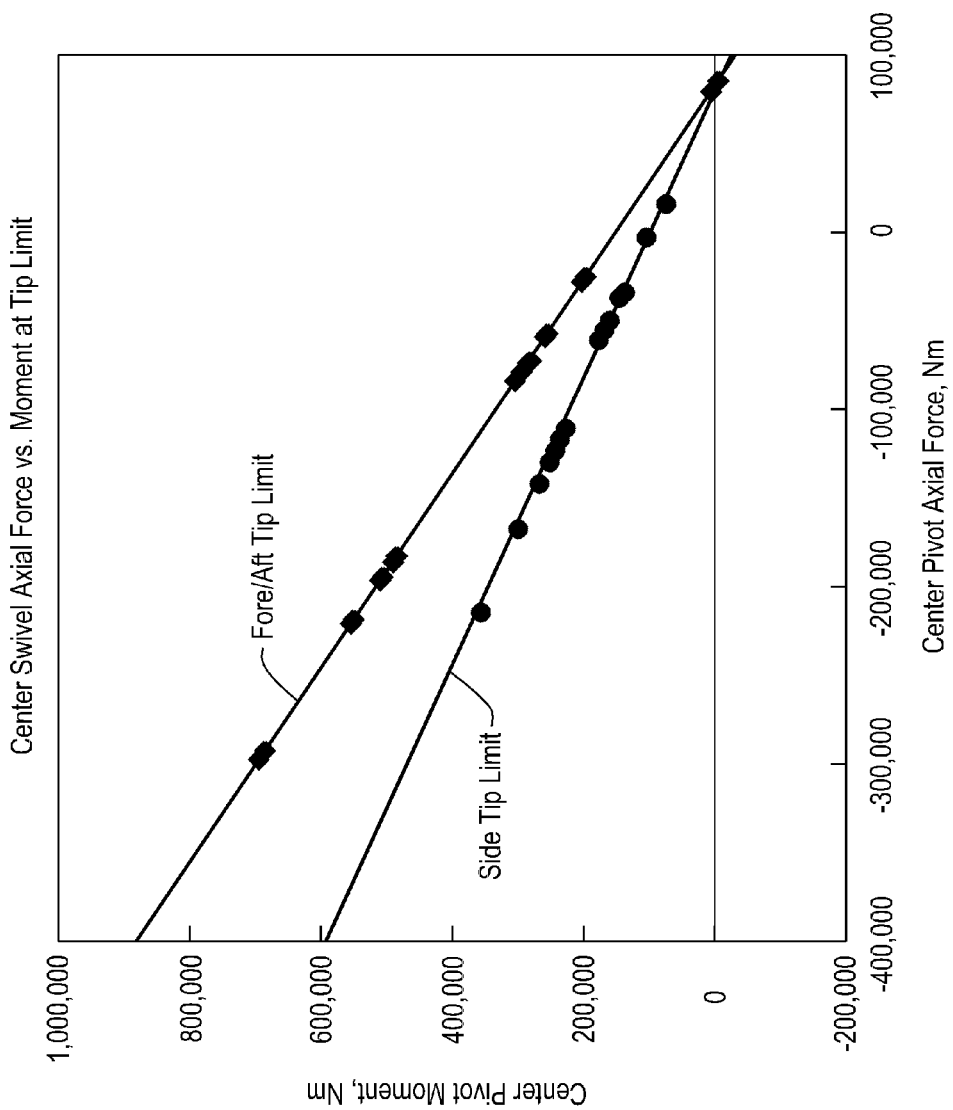
FIG. 9 is a graphical illustration of the tipping limits of the excavator shown in FIGS. 1 and 4-6.

FIG. 9 is a graphical illustration of the tipping limits of the excavator 10 shown in FIGS. 1 and 4-6. For operation on level ground, the result can be represented on a simple graph of the vertical force and moment acting upon the center pivot. Comparing the measured moment to the limit read from the moment curve at the point corresponding to the measured axial force, tipping can be predicted. In the illustrated example, with a measured center pivot force of 200 kN, if the side-to-side moment exceeds approximately 350 kNm, tipping over the side is indicated, whereas tipping over the front idlers would not occur until the fore-to-aft moment reaches approximately 500 kNm. Tipping limits for slope operation should be de-rated in accordance with the prevailing slope angles in each axis.

Figure 10:
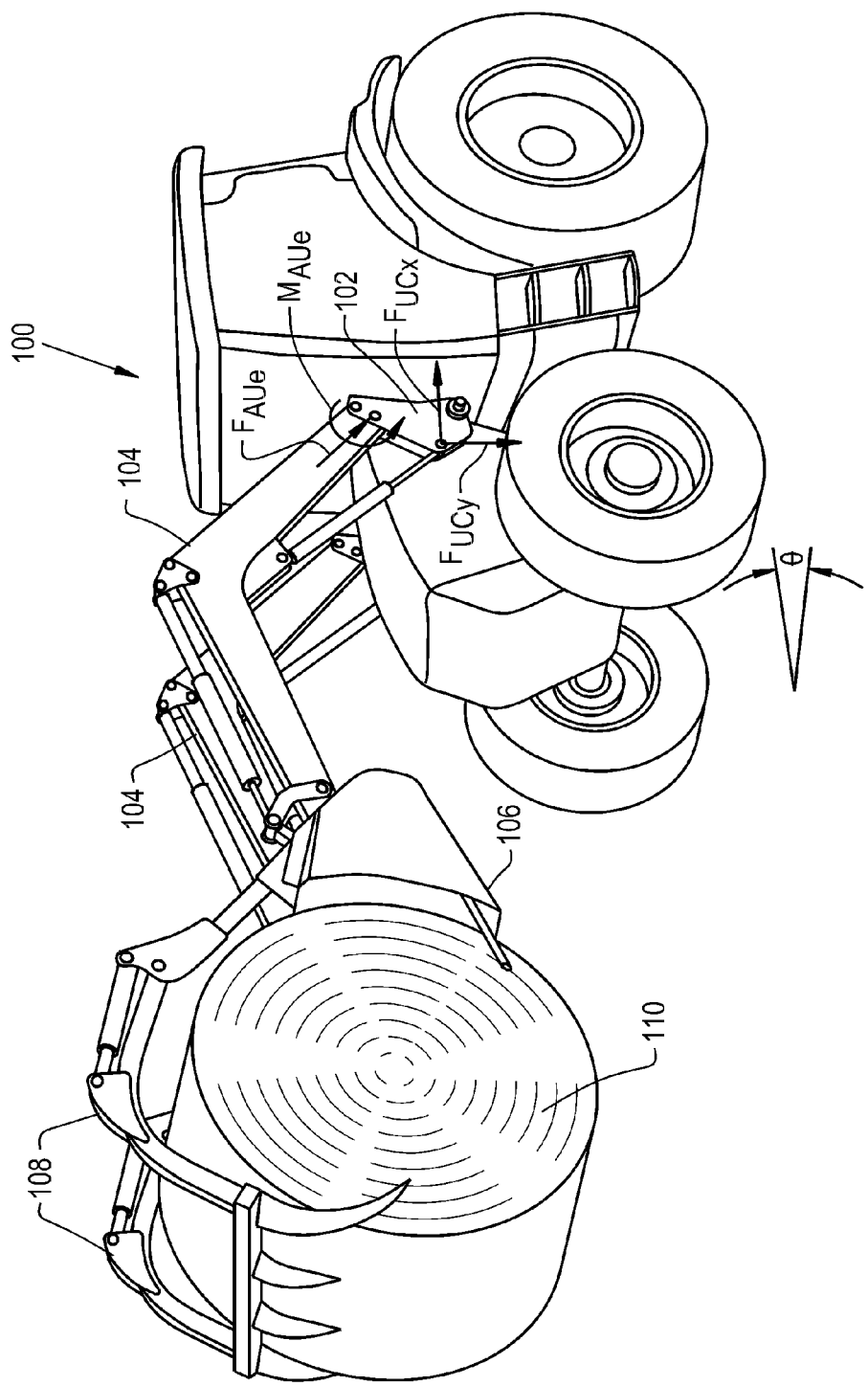
FIG. 10 is a perspective view of another work vehicle in the form of a front end loader with which the tipping indicator of the present invention can be used.

Referring now to FIG. 10, there is shown a perspective view of another embodiment of a work vehicle in the form of a front end loader 100 with which the tipping indicator 32 of the present invention can be used. In contrast with the excavator 10, the front end loader 100 has a unitary frame assembly 14 rather than an upper frame assembly 14B which rotates relative to a lower frame assembly 14A. The unitary frame assembly 14 of course typically includes multiple parts which are connected together, but does not include parts which intentionally move relative to each other, and in that sense can be considered unitary.

The attachment assembly 16 is in the form of a loader which includes a loader frame 102, boom arms 104, a material bucket 106 which can scoop and lift various materials, and grapple hooks 108 which can be used to clamp a bulky material, such as a round hay bale 110. The loader could also include a different type of attachment at the distal end, such as pallet forks, an auger, etc. The loader frame 102 is rigidly connected to the frame assembly 14 of the front end loader 100, typically using heavy fasteners such as bolts. The boom arms 104 are pivotally connected to the loader frame 102 at pivotal connections 30 on either side of the loader 16, which creates an equivalent attachment force $F_{AUe}$ and couple $M_{AUe}$ at the pivotal connections 30 (refer to FIG. 3 of the excavator description above). This attachment force $F_{AUe}$ and couple $M_{AUe}$ are transferred directly through the loader frame 102 to the frame assembly 14, which increases the tipping tendency of the front end loader 100. In FIG. 10, the equivalent attachment force $F_{AUe}$ and couple $M_{AUe}$ are only shown on the left side of the loader frame for simplicity sake; however, it will be appreciated that an equivalent attachment force $F_{AUe}$ and couple $M_{AUe}$ also exist on the right side of the loader frame at the pivot connection. Other than not having to transfer the attachment force and couple back to another pivot joint, the statics analysis shown and described above is the same. The front end loader can likewise include a tipping indicator 32 as described above to inhibit or prevent tipping of the front end loader 100.

Other types of work vehicles having an attachment assembly which is pivotally connected with a unitary frame assembly can also include a tipping indicator 32 of the present invention. For example, a backhoe, skid loader or fork lift can also include such a tipping indicator 32. Further, a work vehicle having an articulated frame assembly with frame parts which pivot about a vertical pivot axis can also utilize the tipping indicator 32 of the present invention. For example, an articulated wheel loader (not shown) would still have an attachment assembly in the form of a loader as described above with reference to front end loader 100, and utilize substantially the same statics analysis to determine the onset of a tipping condition.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle, comprising:
   a frame assembly;
   an attachment assembly having an attachment end which is pivotally connected to the frame assembly and a distal end which is configured for receiving a variable load;
   at least one force sensor for sensing at least one force associated with the attachment end, the at least one force sensor providing an output signal representing the sensed at least one force;
   an inclination sensor for sensing an inclination associated with the frame assembly relative to a horizontal reference, the inclination sensor providing an output signal representing the sensed inclination;
   a controllable output; and
   an electrical processing circuit coupled with the at least one force sensor, the inclination sensor, and the controllable output, the electrical processing circuit being configured for:
   receiving the output signal from the at least one force sensor,
   determining a value of an equivalent force at the pivotal connection between the attachment assembly and the frame assembly which is associated with the sensed at least one force,
   determining a value of an equivalent couple at the pivotal connection between the attachment assembly and the frame assembly which is associated with the sensed at least one force,
   comparing the equivalent force with a threshold value,
   comparing the equivalent couple with a threshold value which is dependent on the sensed inclination, and
   controlling the controllable output dependent on the comparison of the equivalent force and the comparison of the equivalent couple.

2. The work vehicle of claim 1, wherein the frame assembly includes an upper frame assembly pivotally connected with a lower frame assembly about a vertical pivot axis, and wherein the couple is associated with the pivotal connection between the upper frame assembly and the lower frame assembly.

3. The work vehicle of claim 2, wherein the attachment assembly is pivotally connected to the upper frame assembly, wherein the attachment assembly has a couple and an attachment force at the pivotal connection with the upper frame assembly, and wherein the couple determined by the electrical processing circuit is located at the pivotal connection between the upper frame assembly and the lower frame assembly.

4. The work vehicle of claim 2, wherein the inclination sensor is configured for sensing an inclination associated with the lower frame assembly.

5. The work vehicle of claim 2, wherein the at least one force sensor includes at least two force sensors positioned approximately 90° apart about the vertical pivot axis.

6. The work vehicle of claim 5, wherein the at least two force sensors include four force sensors positioned approximately 90° apart about the vertical pivot axis.

7. The work vehicle of claim 5, wherein the at least two force sensors are strain gauges.

8. The work vehicle of claim 2, wherein the work vehicle is an excavator, a crane, a sky lift, or a feller/buncher.

9. The work vehicle of claim 1, wherein the pivotal connection between the attachment assembly and the frame assembly has a generally horizontal pivot axis, and wherein the at least one force sensor includes at least two force sensors positioned approximately 90° apart about the horizontal pivot axis.

10. The work vehicle of claim 1, wherein the work vehicle is a front end loader, a backhoe, a skid loader, or a fork lift.

11. The work vehicle of claim 1, wherein the determined couple includes an effect of a variable distance from the frame assembly to the distal end of the attachment assembly.

12. The work vehicle of claim 1, wherein the controllable output comprises at least one of an indicator and an actuator.

13. The work vehicle of claim 12, wherein the indicator includes at least one of a visual indicator and an audible alarm.

* * * * *